United States Patent
Chen et al.

(10) Patent No.: US 9,217,873 B2
(45) Date of Patent: Dec. 22, 2015

(54) LIQUID CRYSTAL DISPLAY WITH SHIFTED PIXELS

(71) Applicant: Innolux Corporation, Miao-Li County (TW)

(72) Inventors: Jian-Cheng Chen, Miao-Li County (TW); Tsung-Han Tsai, Miao-Li County (TW); Bo-Chin Tsuei, Miao-Li County (TW); Hong-Sheng Hsieh, Miao-Li County (TW); Chia-Liang Hung, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 365 days.

(21) Appl. No.: 13/803,045

(22) Filed: Mar. 14, 2013

(65) Prior Publication Data
US 2013/0300956 A1 Nov. 14, 2013

(30) Foreign Application Priority Data
May 11, 2012 (TW) .............................. 101116945 A

(51) Int. Cl.
*G02F 1/1335* (2006.01)
*G02F 1/1343* (2006.01)
*G02F 1/1337* (2006.01)
*G02B 27/22* (2006.01)
*G02F 1/13* (2006.01)

(52) U.S. Cl.
CPC .......... *G02B 27/2214* (2013.01); *G02F 1/1313* (2013.01); *G02F 1/133514* (2013.01); *G02F 1/134336* (2013.01); *G02F 2201/52* (2013.01)

(58) Field of Classification Search
CPC ............ G02F 1/1313; G02F 1/134336; G02F 1/133707; G02F 1/1393; G02F 1/133753; G02B 27/2214; G02B 27/26; H04N 13/0404
USPC ................................... 349/15, 143, 146, 129
See application file for complete search history.

(56) References Cited

U.S. PATENT DOCUMENTS

| | | | |
|---|---|---|---|
| 8,228,375 B2 * | 7/2012 | Liu | 348/51 |
| 2010/0188623 A1 * | 7/2010 | Nakagawa | 349/96 |
| 2013/0114134 A1 * | 5/2013 | Inoue et al. | 359/462 |

FOREIGN PATENT DOCUMENTS

| | | |
|---|---|---|
| TW | 201028734 A | 8/2010 |
| WO | 2011155272 A1 | 12/2011 |

OTHER PUBLICATIONS

TW Office Action dated Oct. 16, 2014.

* cited by examiner

*Primary Examiner* — Mike Qi
(74) *Attorney, Agent, or Firm* — McClure, Qualey & Rodack, LLP

(57) ABSTRACT

A liquid-crystal display (LCD) includes a backlight unit, a display module and a barrier. The display module is disposed above the backlight unit and has plural pixels. Each of the pixels includes at least three differently-colored sub-pixels, and the differently-colored sub-pixels at adjacent columns are in a shifting arrangement. The barrier is disposed correspondingly to the display module, and has several slanted transparent slits. The transparent slits substantially expose at least parts of regions of the sub-pixels corresponding to the same viewing position. The sub-pixels are rectangular, rhombus or hexagonal in shape.

20 Claims, 7 Drawing Sheets

LIQUID CRYSTAL DISPLAY WITH SHIFTED PIXELS

This application claims the benefit of Taiwan application Serial No. 101116945, filed May 11, 2012, the subject matter of which is incorporated herein by reference.

BACKGROUND

1. Field of the Invention

The disclosure relates in general to a liquid crystal display (LCD) with shifted pixels, and more particularly to a naked-eye three-dimensional (3D) LCD with shifted pixels.

2. Description of the Related Art

Being compact in size, light in weight, power-saving and radiation-free, liquid crystal displays (LCDs) are prevalent in diversified applications from small-sized portable information products such as personal digital assistants (PDAs), medium-sized LCD monitors of laptop computers or desktop computer monitors, to large-sized 30 to 50-inch LCD televisions. LCDs are in fact an essential part of the daily life electronic products.

By offering a wide viewing angle in an LCD, an observer may perceive images having small color and brightness differences when observing the LCD from a frontal viewing angle and from side viewing angles. The effect can be achieved through enhancing the quality of side-viewing-angle images by forming a multi-domain in a single sub-pixel region. Various types of wide angle techniques are available, from which three types namely vertical alignment (VA), in-plane switching (IPS)/fringe-field switching (FFS), and twisted nematic (TN) cooperating a wide-angle compensation film are most well-known. An LCD based on vertical alignment includes multi-domain vertical alignment (MVA) having protrusions, and pattern vertical alignment (PVA) that does not have protrusions and forms multiple slits on a transparent electrode (e.g., indium tin oxide (ITO) on a color filter (CF)). The presence of the protrusions and slits cause a pre-tilted angle in liquid crystal molecules and thus tilted electric fields. In PVA, an aperture can be increased to further enhance the brightness without incurring a severe issue of dark-state light leakage as that caused by conventional MVA. In the recently developed polymer stabilization alignment (PSA), a small amount of monomer is added to liquid crystal molecules, and a voltage is applied after injecting the liquid crystals to produce a pre-tilted angle for the liquid crystal molecules near a region of the polyimide. With appropriate exposure to UV light, the pre-tilted angle is stabilized while also completing polymer stabilization and liquid crystal alignment. Accordingly, PSA is capable of mitigating the dark-state light leakage issue and further enhancing contrast.

Further, a rubbing or non-rubbing technique may be implemented in an alignment process of an alignment film at an inner side of upper and lower substrates (e.g., a TFT substrate and a CF substrate), so that liquid crystal molecules may align according to a predetermined direction and a predetermined tilt angle regardless of whether electric fields are present to achieve multi-domain alignment. For example, the non-rubbing technique includes ion beam alignment, plasma alignment and photo-alignment (PA). The non-rubbing technique is increasingly drawing attention as it solves issues of electrostatic electricity and dust pollution. The PA approach among the non-rubbing technique is based on triggering optical anisotropy by radiating an alignment film with polarized UV light. In a manufacturing process of the PA approach, an alignment material (e.g., a photosensitive polymer) is applied to a glass substrate such as a TFT substrate and a CF substrate followed by applying UV light radiation, such that photopolymerization, isomerization and cracking are incurred at the polymer structure of the alignment film. Thus, a special directionality is produced in bond structures at a surface of the alignment film and is automatically guided into a radiation angle of the UV light, so as to further cause the pre-tilted angle of the liquid crystal molecules in the liquid crystal layer to automatically align along the direction of the macromolecules of the polymer of the alignment film.

Displays such as liquid crystal displays (LCDs) have been developed to provide three-dimensional (3D) displays in various kinds of displays. Currently, most of 3D displays require the use of special headgear or glasses and provide the 3D displaying effect for users. Due to inconveniency of the use of headgear or glasses, many manufacturers have been studied and advanced towards the technology of autostereoscopic display.

Autostereoscopic displays, also known as "Naked eye 3D display", are able to provide binocular depth perception without the hindrance of specialized headgear or filter/shutter glasses. Naked eye 3D displays have been demonstrated using a range of optical elements in combination with an LCD including parallax barrier technology and lenticular optic technology to provide stereoscopic vision. Generally, the parallax barrier has optical apertures aligned with columns of LCD pixels, and the lenticular optics has cylindrical lenses aligned with columns of LCD pixels. A parallax barrier could be a sheet or an electro optic panel with fine slits to separate the light pathway of spatial images into images for left eye and right eye, and this reconstructed scene of the left eye image and right eye image is perceived as 3D images by the observer. FIG. 1 is a conventional 3D display with parallax barrier. A parallax barrier 15 is positioned in front of a display panel 11, and between human eyes and the display panel 11. The backlight module 13 emits light. The parallax barrier 15 with transparent and opaque strips limits the pixels only radiate light in directions seen by the left eye or right eye. In the accurate alignment between the backlight module 13 and the display panel 11, the left eye and the right eye of the observer would receive images on the odd numbered pixels and even numbered pixels, respectively. When different images are presented on the odd numbered pixels and even numbered pixels of the display panel 11 and received by the left eye and the right eye correspondingly, it is capable of providing depth perception and stereoscopic vision to the viewer. Alternatively, the parallax barrier 15 could be positioned behind the display panel 11, and between the backlight module 13 and the display panel 11. The transparent and opaque strips of the parallax barrier 15 are still able to partially block the light emitted from the backlight module 13 and only transparent strips allow penetration of light, thereby achieving the 3D displaying effect without glasses.

In a conventional naked-eye 3D LCD, multiple rectangular sub-pixels are aligned in a matrix arrangement. A barrier with grating stripes, formed by perpendicularly alternate transparent slits and opaque shields of a barrier, is placed on the display panel which displays a pattern for image fusion, and the direction of the slits is perpendicular to the direction of the rectangular sub-pixels. However, the above arrangement likely causes a Moire Effect to human eyes. On the other hand, if the slits are arranged relative to the sub-pixels by a tilted angle, crosstalk between images can easily be resulted. FIG. 2 shows a top view of pixels and a parallax barrier of a display module in a conventional naked-eye 3D LCD. A display module 21 includes a plurality of pixels, each having at least three differently-colored sub-pixels 22, e.g., red, green and blue sub-pixels. In FIG. 2, an example of the naked-eye 3D LCD having six viewing positions is depicted, i.e., R1 to R6 respectively represent the red sub-pixels at first to sixth viewing angles correspondingly. Transparent slits 251 on a barrier 25 are disposed at a tilted angle relative to the red, green and blue sub-pixels. As shown in FIG. 2, crosstalk is resulted since regions of the transparent slits 251 also include parts of adjacent images of the sub-pixels 22 that do not correspond to a same viewing position.

SUMMARY

The disclosure is directed to an LCD with shifted pixels. In the LCD, differently-colored sub-pixels of pixels at adjacent columns are provided in a shifting arrangement. When the LCD is applied to a naked-eye 3D LCD, by setting the sub-pixels corresponding to slanted slits of a parallax barrier, the slits substantially expose at least parts of regions of the sub-pixels corresponding to the same viewing position.

According to one embodiment of the disclosure, an LCD at least including a backlight unit, a display module and a barrier is provided. The display module is disposed above the backlight unit and has multiple pixels. Each of the pixels includes at least three differently-colored sub-pixels, and the differently-colored sub-pixels at adjacent columns are in a shifted arrangement. The barrier is disposed correspondingly to the display module, and has several slanted transparent slits. The transparent slits substantially expose at least parts of regions of the sub-pixels corresponding to a same viewing position. The sub-pixels are rectangular, rhombus or hexagonal in shape.

According to one embodiment of the disclosure, an LCD at least including a backlight unit and a display module disposed above the backlight unit is provided. The display module has multiple pixels each comprising at least three differently-colored sub-pixels. The sub-pixels are arranged in a closest packing manner, and the differently-colored sub-pixels at adjacent columns are in a shifting arrangement. The sub-pixels are rectangular, rhombus or hexagonal in shape.

The above and other aspects of the disclosure will become better understood with regard to the following detailed description of the preferred but non-limiting embodiments. The following description is made with reference to the accompanying drawings.

DETAILED DESCRIPTION

Figure 1:
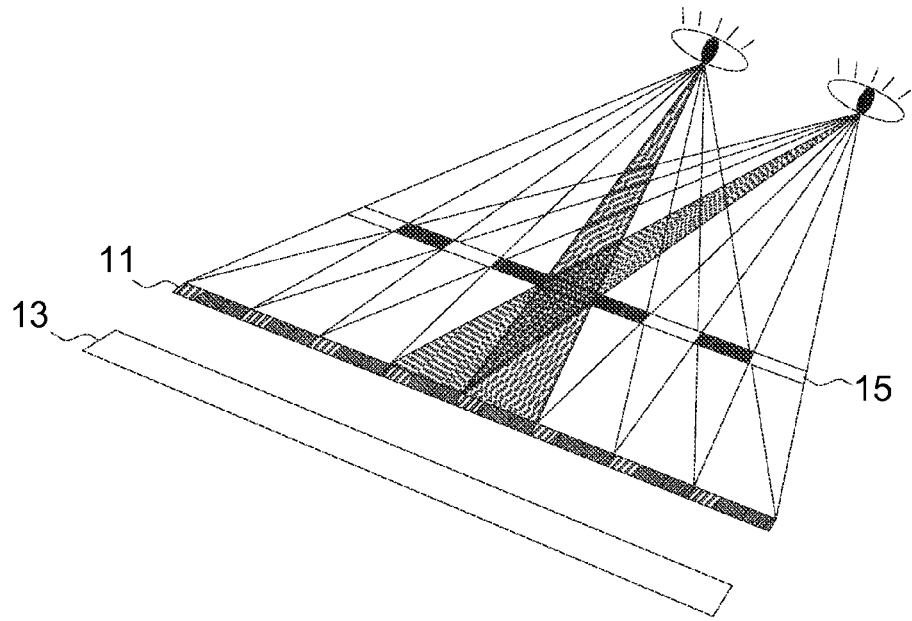
FIG. 1 (prior art) is a schematic diagram of a display device applying a parallax barrier naked-eye 3D display technique.
Figure 2:
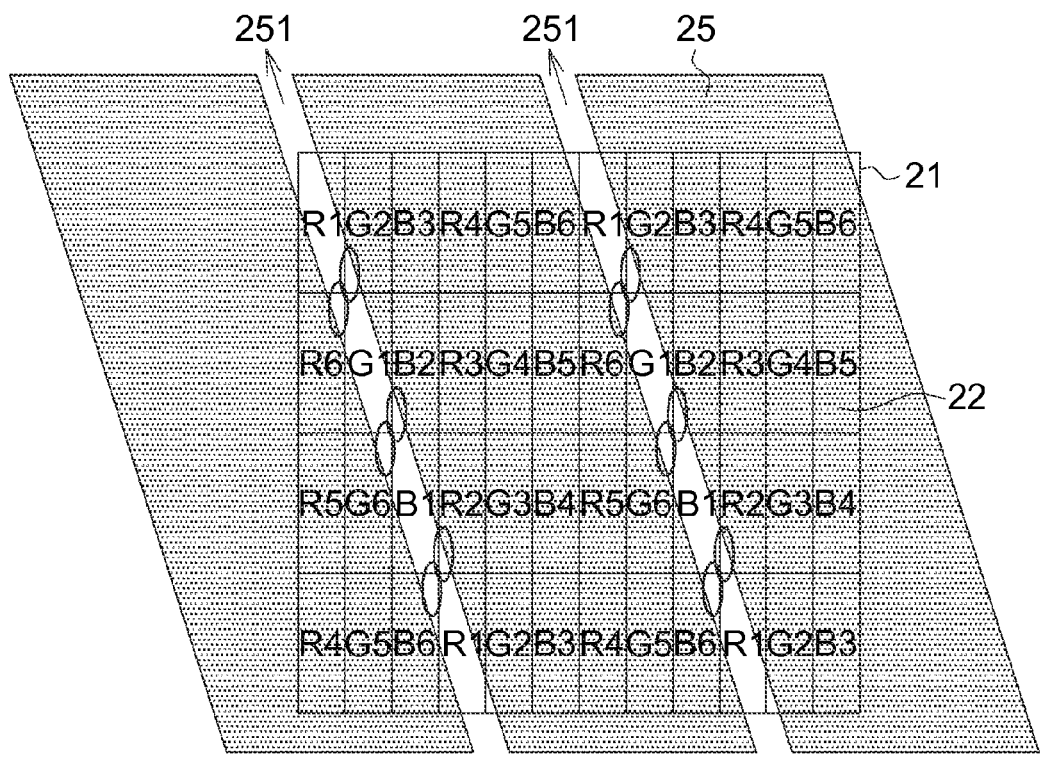
FIG. 2 (prior art) is a top view of pixels of a display module and a barrier in a conventional naked-eye 3D LCD.

In a liquid crystal display (LCD) described in the embodiments below, differently-colored sub-pixels at adjacent columns are provided in a shifting arrangement. Thus, when the LCD is implemented in cooperation with slanted slits of a barrier in a naked-eye 3D LCD, the slits correspond to positions of the shifted sub-pixels substantially expose at least parts of regions of the sub-pixels corresponding to the same viewing position, so as to minimize crosstalk between images and to mitigate a Moire Effect.

Several embodiments are described with the accompanying drawings. It should be noted that detailed structures of the embodiments are described by way of example, and the described details of the embodiments are not intended to limit the present disclosure. Further, the accompany drawings are simplified for clear illustrations of the embodiment; sizes and proportions in the drawings are not directly proportional to actual products, and shall not be construed as limitations to the present disclosure.

Figure 3:
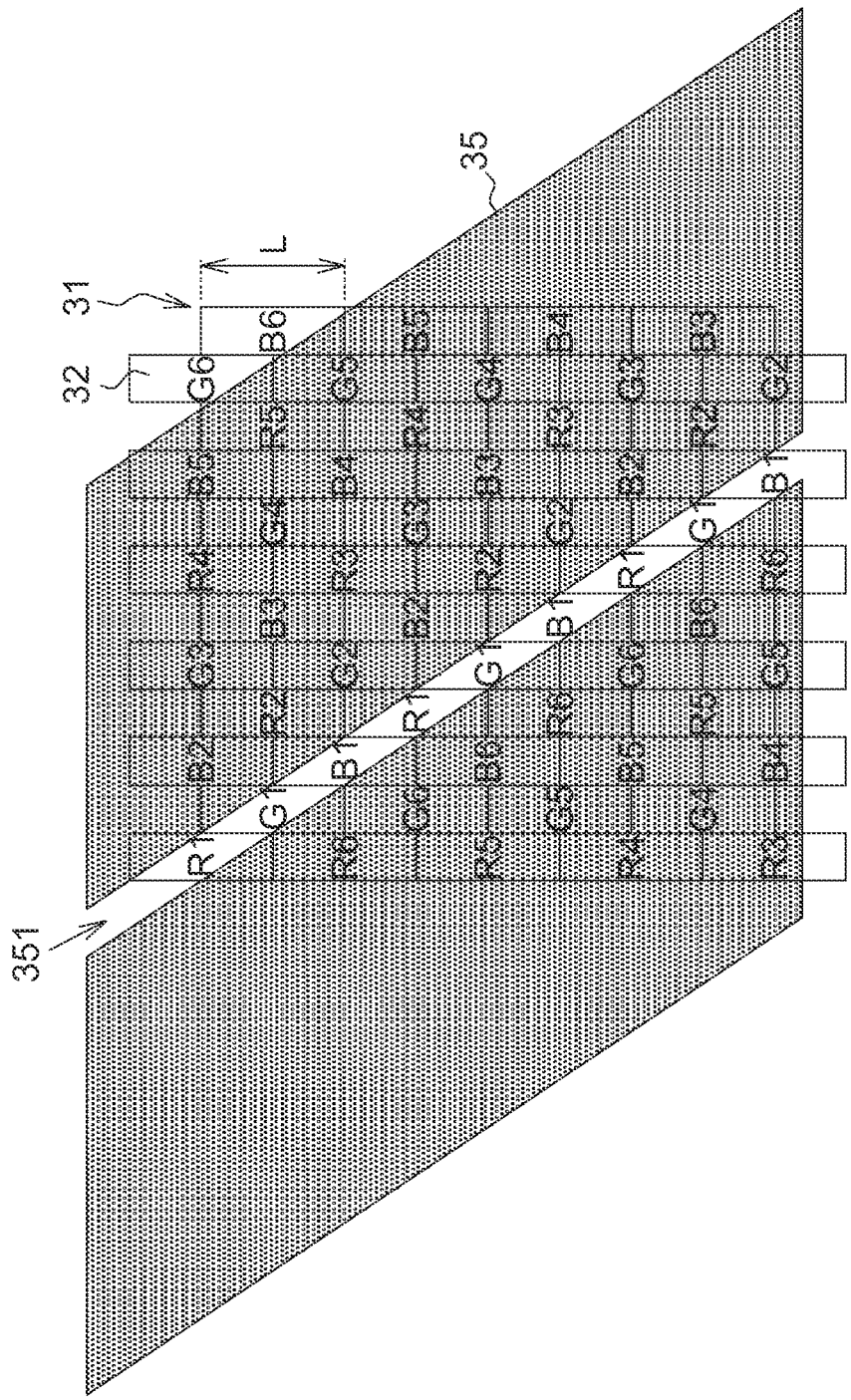
FIG. 3 is a top view of pixels of a display module and a barrier in a naked-eye 3D LCD according to the first embodiment of the present disclosure.

FIG. 3 shows a top view of pixels of a display module and a barrier in a naked-eye 3D LCD according to the first embodiment of the present disclosure. The naked-eye 3D LCD at least includes a backlight unit, a display module 31 disposed above the backlight unit, and a barrier 35 (e.g., disposed above the display module 31) corresponding to the display module 31. The backlight unit is disposed below the display module 31 to provide a light source to the display module 31.

The display module 31 has a plurality of pixels, each including at least three differently-colored sub-pixels 32, e.g., red, green and blue sub-pixels 32. In FIG. 3, an example of the naked-eye 3D LCD having six viewing positions is depicted, i.e., R1 to R6 respectively represent red sub-pixels corresponding to the first to sixth viewing angles, G1 to G6 respectively represent green sub-pixels corresponding to the first to sixth viewing angles, and B1 to B6 respectively represent blue sub-pixels corresponding to the first to sixth viewing angles. In the first embodiment, the rectangular sub-pixels, and different-colored sub-pixels at adjacent columns in a shifting arrangement are illustrated for description. For example, the red sub-pixels R1 at the first column and the green sub-pixels at the adjacent second column are in a shifting arrangement.

The barrier 35 has a plurality of slanted transparent slits 351, which allow human eyes to perceived separated left and right images when viewing the images through the slits to further produce a naked-eye 3D visual effect. In the first embodiment, each transparent slit 351 corresponds to a set of parallel sides of a part of the sub-pixels to substantially expose at least parts of regions of the sub-pixels corresponding to the same viewing position. For example, the transparent slit 351 corresponds to a pair of long parallel sides of each of the red sub-pixels R1, the green sub-pixels G1 and the blue sub-pixels B1 at the first viewing angle, so as to expose parts of the regions of these sub-pixels at the first viewing position. For example, the other sub-pixel regions at the second to sixth viewing positions correspond to opaque regions of the barrier 35. Thus, according to this embodiment, with not only a 3D effect but also reduced crosstalk between adjacent images, different images of different viewing angles can be perceived by human eyes when observing at a particular viewing position within an effective 3D viewing distance. In addition, the slit 351 disposed at a tilted angle relative to the sub-pixels further reduce the Moire Effect.

In the first embodiment, the differently-colored rectangular sub-pixels at different adjacent columns are provided in a shifting arrangement that shifts a long side by a fixed length. For example, the fixed length is between ¼ and ¾ of the long side. In an embodiment, assuming that the long side of each rectangular sub-pixel is L, the adjacent sub-pixel is shifted by ½L to be in a shifting arrangement. In practice, the shifted level of the adjacent sub-pixels is associated with a slanted angle of the transparent slits 351. It should be noted that, given that the transparent slits 351 of the barrier 35 are capable of substantially exposing parts of the regions of the rectangular sub-pixels corresponding to the same viewing position, and the sub-pixels at other different viewing positions correspond to opaque regions of the barrier 35, modifications can be made to the above arrangement details of the first embodiment, as such modifications are also encompassed within the scope of the present disclosure.

Figure 4:
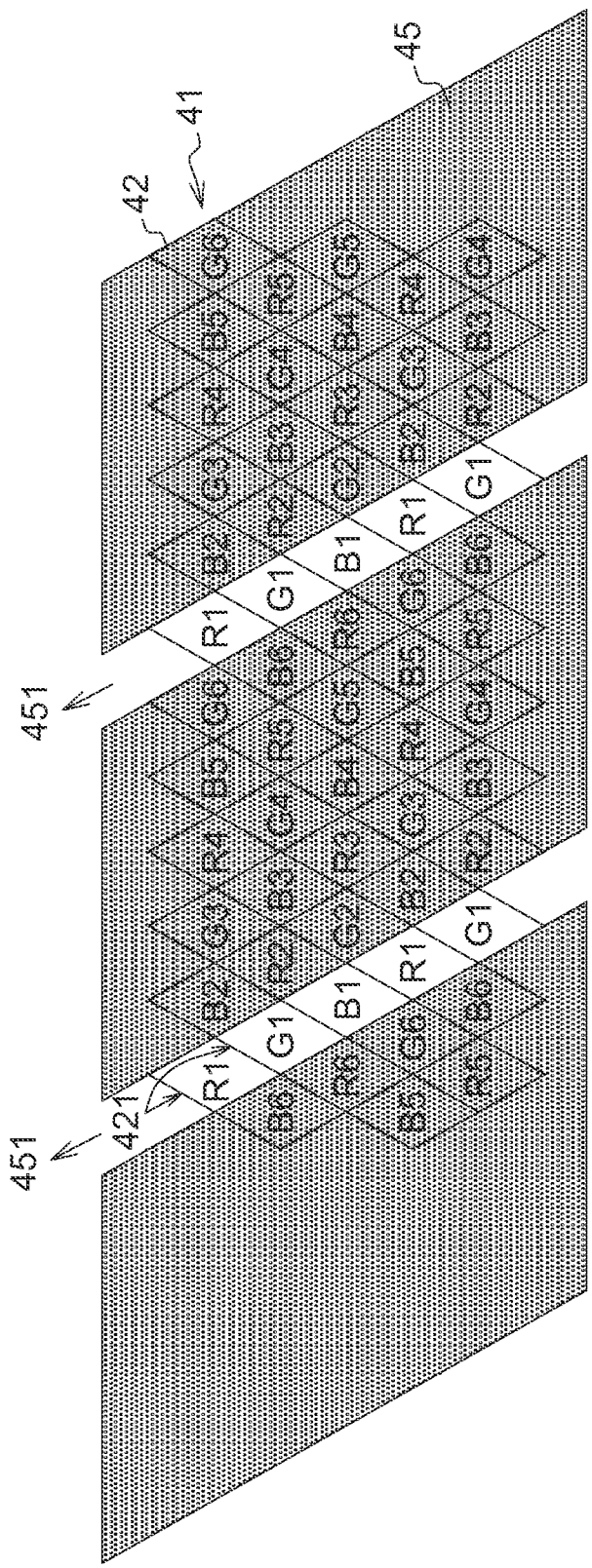
FIG. 4 is a top view of pixels of a display module and a barrier in a naked-eye 3D LCD according to the second embodiment of the present disclosure.

FIG. 4 shows a top view of pixels of a display module and a barrier in a naked-eye 3D LCD according to the second embodiment of the present disclosure. Similarly, the naked-eye 3D LCD according to the second embodiment at least includes a backlight unit, a display module 41 disposed above the backlight unit, and a barrier 45 (e.g., disposed above the display module 41) corresponding to the display module 41. The display module 41 has a plurality of pixels, each comprising three differently-colored sub-pixels 42, e.g., red, green and blue sub-pixels 42. Also taking an example of six viewing positions, R1 to R6, G1 to G6, and B1 to B6 respectively represent red sub-pixels, green sub-pixels and blue sub-pixels corresponding to the first to sixth viewing angles. The barrier 45 has a plurality of slanted transparent slits 451 for providing a parallax barrier effect.

In the second embodiment, the sub-pixels are rhombus in shape, the sub-pixels are arranged along the sides in a closest packing manner, and the differently-colored sub-pixels at adjacent columns are in a shifting arrangement. For example, the red sub-pixel R1 at the first column and the green sub-pixel G1 at the adjacent second column are shifted, as shown in FIG. 4. For example, the transparent slit 451 corresponds to a pair of parallel sides 421 of a part of the rhombus sub-pixels to expose all the regions of the sub-pixels (e.g., the red sub-pixel R1, the green sub-pixel G1 and the blue sub-pixel B1 at the first viewing angle) at the same viewing position. For example, the sub-pixel regions at the second to sixth viewing positions are located at opaque regions of the barrier 45. Thus, the second embodiment allows a viewer within an effective 3D viewing distance to view images without crosstalk of adjacent images.

Further, a shape and a length of the rhombus sub-pixels are associated with a slanted angle of the transparent slits 451. It should be noted that, given that the transparent slits 451 of the barrier 35 are capable of substantially exposing the regions of the rhombus sub-pixels corresponding to the same viewing position, and the sub-pixels at other different viewing positions correspond to the opaque regions of the barrier 45, adjustments and modifications can be made according to actual requirements and conditions, as such modifications are also encompassed within the scope of the present disclosure.

Figure 5:
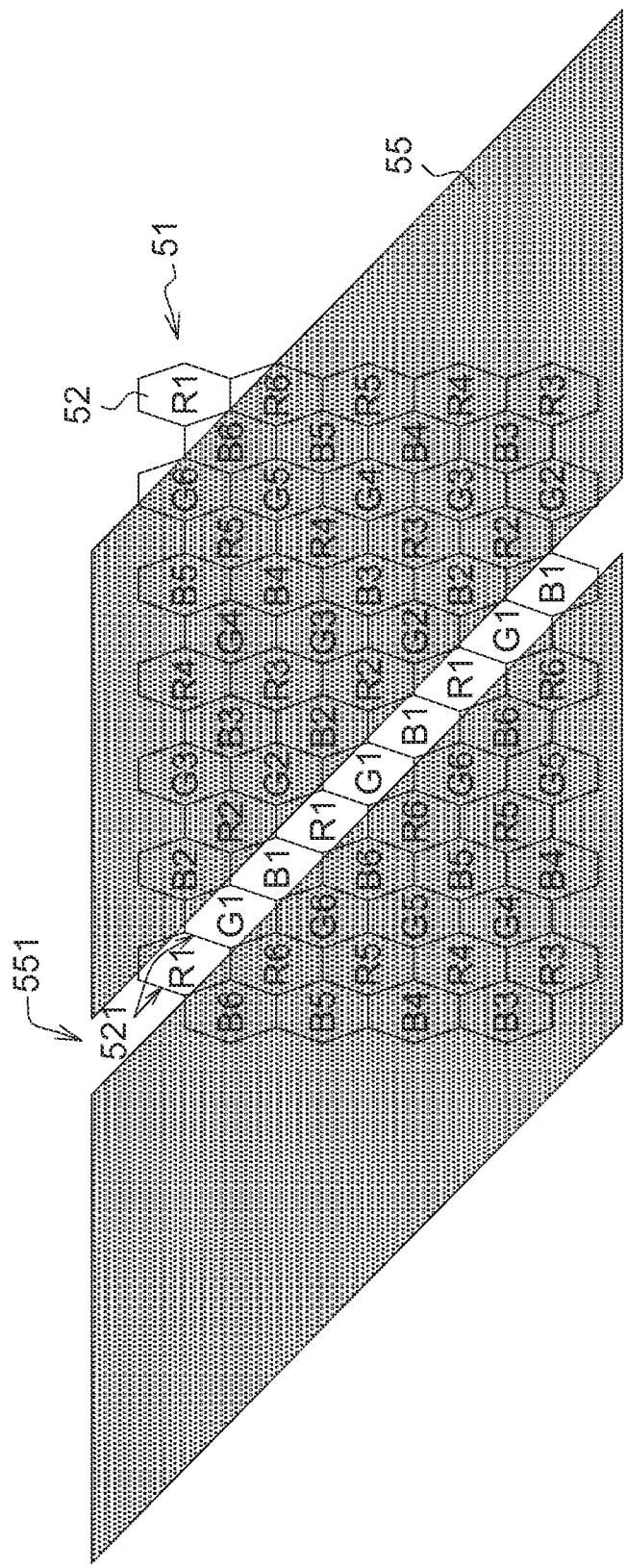
FIG. 5 is a top view of pixels of a display module and a barrier in a naked-eye 3D LCD according to the third embodiment of the present disclosure.

FIG. 5 shows a top view of pixels of a display module 51 and a barrier in a naked-eye 3D LCD according to the third embodiment of the present disclosure. In the third embodiment, the sub-pixels are hexagonal in shape, and the differently-colored hexagonal sub-pixels at adjacent columns are in a shifting arrangement. For example, in FIG. 5, the red sub-pixel R1 at the first column and the green sub-pixel G1 at the adjacent second column are shifted. For example, a transparent slit 551 corresponds to a pair of parallel sides 521 of a part of the hexagonal sub-pixels to substantially expose most parts of the regions of the sub-pixels (e.g., the red sub-pixel R1, the green sub-pixel G1 and the blue sub-pixel B1 at the first viewing angle) corresponding to the same viewing position. For example, the sub-pixel regions at the second to sixth viewing positions substantially correspond to the opaque regions of the barrier 55. For example, all the hexagonal sub-pixels 52 are arranged along the sides in a closest packing manner. Thus, this embodiment allows a viewer within an effective 3D viewing distance to view images without crosstalk of adjacent images. Since the slits 551 are disposed at a tilted angle relative to the sub-pixels 52, a Moire Effect can be reduced. Further, this embodiment is also capable of diminishing the interference such as crosstalk between images of adjacent sub-pixels.

In order to offer a wide viewing angle in an LCD so that an observer may perceive images having small color and brightness differences when observing the LCD from a frontal viewing angle and from side viewing angles, a multi-domain is formed in a single sub-pixel region to enhance the quality of side-viewing-angle images (i.e. images viewed from side viewing angle). The multi-domain in a single sub-pixel region can enhance the quality of side-viewing-angle images to offer a wide viewing angle in an LCD.

Figure 6:
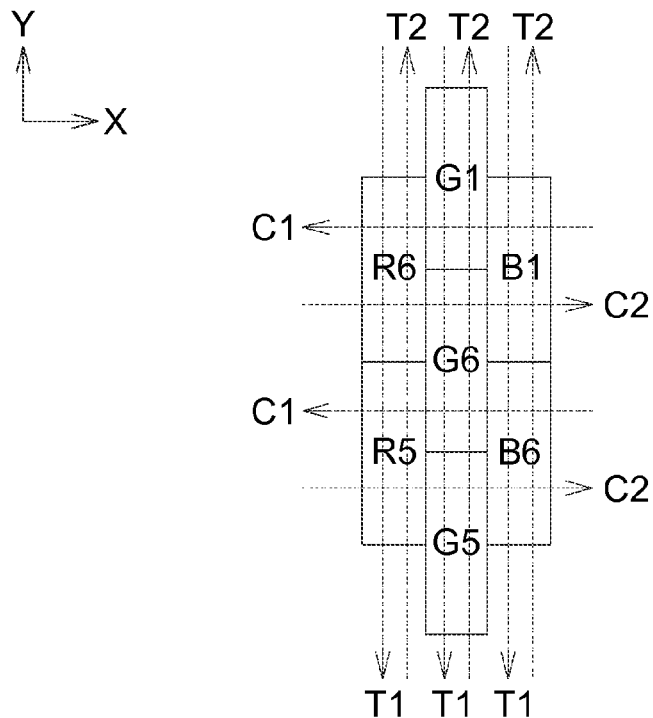
FIG. 6 is a schematic diagram of the rectangular sub-pixels with a multi-domain in the LCD according to the first embodiment of the present disclosure.

FIG. 6 shows a schematic diagram of the rectangular sub-pixels with a multi-domain in the LCD according to the first embodiment of the present disclosure. Please also refer to FIG. 3. In an embodiment, the LCD includes a first substrate having a first optical alignment layer, a second substrate having a second optical alignment layer and disposed correspondingly to the first substrate, and a liquid crystal layer having a plurality of liquid crystal molecules and disposed between the first and second substrates (which are not shown in FIG. 3 or FIG. 6). As previously stated in the description of the first embodiment, the LCD includes a plurality of pixels, each including red, green and blue rectangular sub-pixels 62. In FIG. 6, the red sub-pixels R6 and R5, the green sub-pixels G1, G6 and G5, and the blue sub-pixels B6 and B1 are taken as an example. C1 and C2 represent the exposure directions at the CF substrate side, and a CF-side liquid crystal pre-tilted direction is formed at the corresponding region along the direction C1 or C2 (i.e., the −X direction or X direction). T1 and T2 represent the exposure directions at the TFT substrate side, and a TFT-side liquid crystal pre-tilted direction is formed at the corresponding region along the direction T1 or T2 (i.e., the −Y direction or Y direction). As the exposure directions C1, C2, T1 and T2 shown in FIG. 6, four alignment regions with different alignment directions can be formed in each of the sub-pixels 62. Thus, the alignment approach of the first embodiment is capable of enhancing the quality of side-viewing-angle images.

Figure 7A:
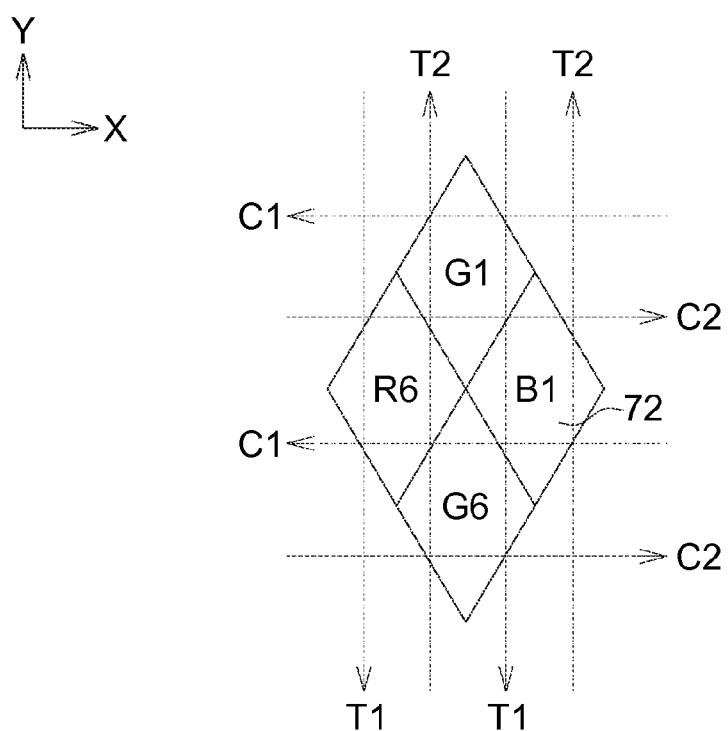
FIG. 7A is a schematic diagram of the rhombus sub-pixels with a multi-domain in the LCD according to the second embodiment of the present disclosure.
Figure 7B:
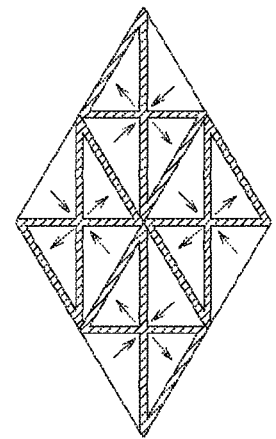
FIG. 7B is a schematic diagram of alignment regions and dark-state regions of the rhombus sub-pixels in FIG. 7A.

FIG. 7A shows a schematic diagram of rhombus sub-pixels with a multi-domain in the LCD according to the second embodiment of the present disclosure. FIG. 7B is a schematic diagram of alignment regions and dark-state regions of the rhombus sub-pixels in FIG. 7A. Also with reference to FIG. 4, as previously stated in the description of the second embodiment, the LCD includes a plurality of pixels, each including red, green and blue rhombus sub-pixels 72. In FIG. 7A, the red sub-pixel R6, the green sub-pixels G1 and G6, and the blue sub-pixels B1 are taken as an example. The exposure directions C1 and C2 at the CF substrate side and exposure directions T1 and T2 at the TFT substrate side allow each of the rhombus sub-pixels 72 to form four alignment regions. In FIG. 7B, arrows in the alignment regions represent the alignment directions (i.e., liquid crystal pre-tilted angles) generated by the resultant of C1/C2 and T1/T2. According to the second embodiment, each of the rhombus sub-pixels 72 has four alignment regions with different alignment directions. A cross-shaped dark pattern is formed at each intersection of the alignment regions, and a border dark pattern is formed at each border region of the alignment regions due to the electric fields and the alignment directions of the alignment regions. Taking the red sub-pixels R6 of FIG. 7A and FIG. 7B for example, the border dark patterns are generated at the lower-left and upper-right sides of the sub-pixel R6. Taking the green sub-pixel G1 for another example, the border dark patterns are generated at the upper-left and lower-right of the sub-pixel G1. The (cross-shaped) central dark pattern is combined with the border dark pattern to form a dark-state region of the sub-pixel. Thus, the alignment approach of the second embodiment is capable of enhancing the quality of side-viewing-angle images.

Figure 8A:
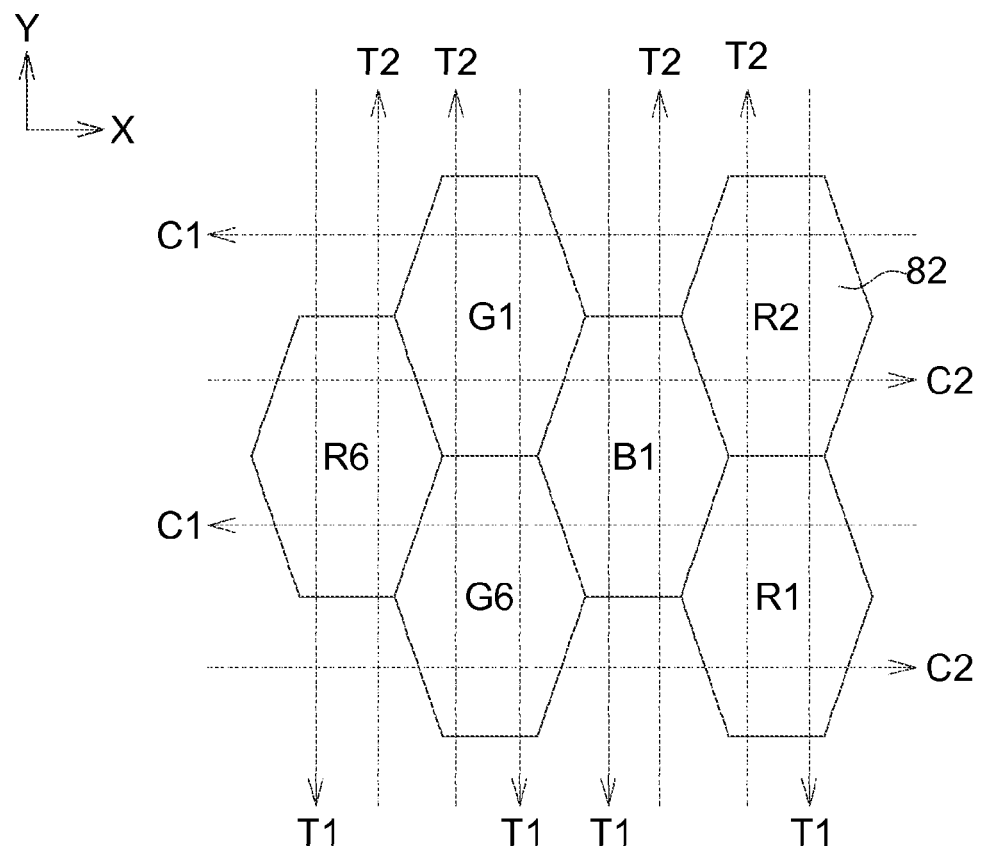
FIG. 8A is a schematic diagram of the hexagonal sub-pixels with a multi-domain in the LCD according to the third embodiment of the present disclosure.
Figure 8B:
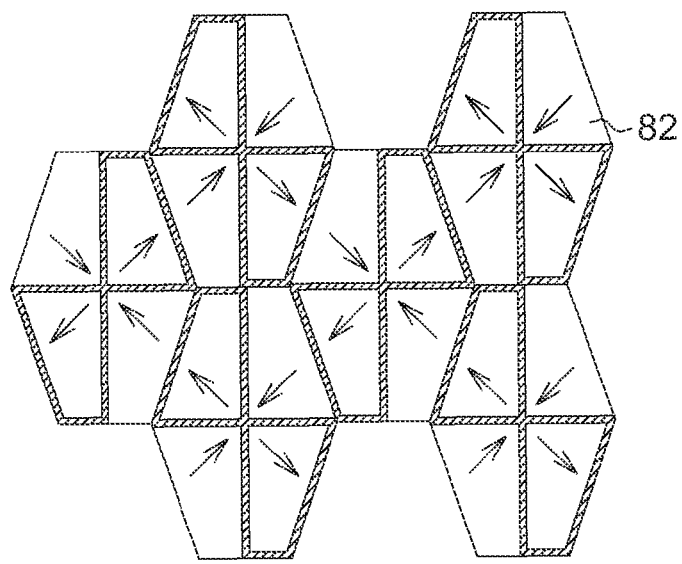
FIG. 8B is a schematic diagram of alignment regions and dark-state regions of the hexagonal sub-pixels in FIG. 8A.

FIG. 8A shows a schematic diagram of hexagonal sub-pixels with a multi-domain in the LCD according to the third embodiment of the present disclosure. FIG. 8B is a schematic diagram of alignment regions and dark-state regions of the hexagonal sub-pixels in FIG. 8A. Also with reference to FIG. 5, as previously stated in the description of the third embodiment, the LCD includes a plurality of pixels, each including red, green and blue hexagonal sub-pixels 82. In FIG. 8A, the red sub-pixels R6, R2 and R1, the green sub-pixels G1 and G6, and the blue sub-pixels B1 are taken for illustration. The exposure directions C1 and C2 at the CF substrate side and the exposure directions T1 and T2 at the TFT substrate side allow each of the hexagonal sub-pixels 82 to form four alignment regions. In FIG. 8B, arrows in the alignment regions represent the alignment directions (i.e., liquid crystal pre-tilted angles) generated by the resultant of C1/C2 and T1/T2. According to the third embodiment, each of the hexagonal sub-pixels 82 has four alignment regions in different alignment directions. A cross-shaped dark pattern is formed at each intersection of the alignment regions, and a border dark pattern is formed at each border region of the alignment regions due to electric fields and alignment directions of the alignment regions. Taking the red sub-pixels R6 of FIG. 8A and FIG. 8B for example, the border dark patterns are generated at the lower-left and upper-right sides of the sub-pixel R6. Taking the green sub-pixel G1 for another example, the border dark patterns are generated at the upper-left and lower-right of the sub-pixel G1. The (cross-shaped) central dark pattern is combined with the border dark pattern to form a dark-state region of the sub-pixel. Thus, the multi-domain alignment approach of the third embodiment is capable of enhancing the quality of side-viewing-angle images.

In addition to the four different alignment regions formed in different alignment directions in each of the sub-pixels, in the same-colored sub-pixels of two adjacent pixels at the same viewing angle, four alignment regions respectively having four different alignment directions may also be formed to respectively provide four different pre-tilted directions to the liquid crystals corresponding to the four alignment regions, so as to enhance the quality of side-viewing-angle images. In an embodiment, each sub-pixel includes a first sub-region and a second sub-region respectively having two alignment regions in different alignment directions. In an embodiment, the two alignment directions of the first and second sub-regions are in a top-and-bottom arrangement. In yet another embodiment, the two alignment directions of the first and second sub-regions are in a left-and-right arrangement. In an embodiment, taking the left-and-right arrangement for example, two first sub-regions of same-colored sub-pixels of adjacent pixels at the same viewing angle may form four alignment regions in different alignment directions, while two second sub-regions may also form four alignment regions in different alignment directions, thereby enhancing the quality of side-viewing-angle images. In an embodiment, in two same-colored sub-pixels of adjacent pixels at the same viewing angle, a second sub-region of one of the sub-pixels and a first sub-region of the other sub-pixel may form four alignment regions in different alignment directions, thereby also similarly enhancing the quality of side-viewing-angle images. Apart from reaching an alignment balance of four different alignment directions using the above same-colored sub-pixels of adjacent pixels, the alignment balance may also be achieved by differently-colored adjacent sub-pixels of the same pixel.

Figure 9:
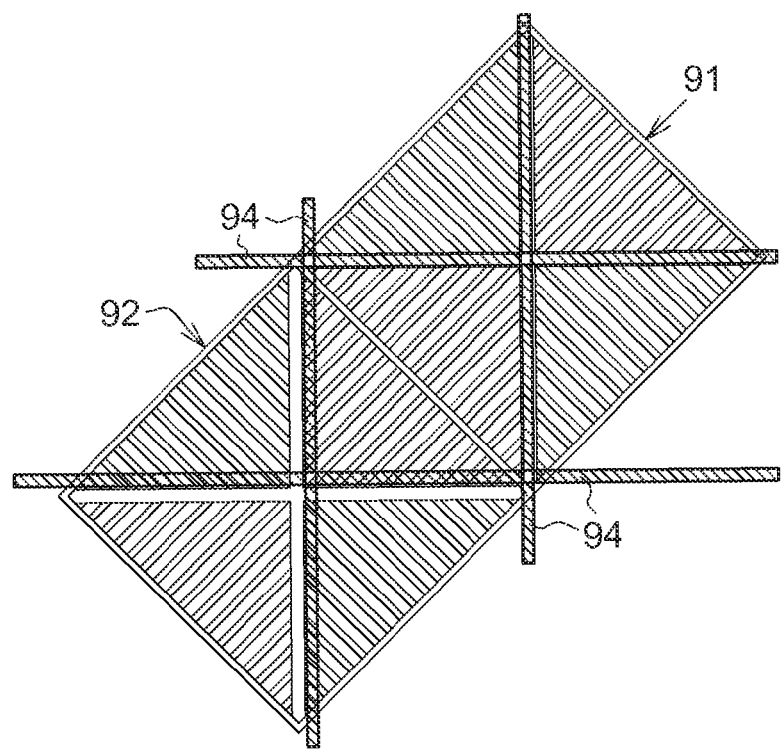
FIG. 9 is a schematic diagram of transparent electrodes of the rhombus sub-pixels and conducting wires according to the second embodiment of the present disclosure.

Compared to the PVA and PSA techniques having a lower tolerance for positioning accuracy of a conducting wire in the center of pixels, the PA techniques accepts a higher tolerance for a shift level of the conducting wire in the center of pixels. FIG. 9 shows a schematic diagram of transparent electrodes of rhombus sub-pixels and conducting wires according to the second embodiment of the present disclosure. As shown in FIG. 9, an indium tin oxide (ITO) trunk is usually presented in the center of transparent electrodes 91 and 92; the transparent electrode (e.g., ITO) 91 of the upper-right sub-pixels is aligned with the conducting wire 94, and the transparent electrode (e.g., ITO) 92 of the lower-left sub-pixel is slightly shifted from the conducting wire 94.

With respect to the MVA and PSA techniques, as shown by the two situations of the conducting wire 94 accurately and not-accurately aligned with the transparent electrodes in FIG. 9, different amounts of coupling capacitance would be generated due to the different overlapping areas between the conducting wires 94 and the transparent electrodes 91 and 92. However, by adopting the PA technique, since the transparent electrode at the TFT substrate side is an un-patterned plane, the overlapping areas between the conducting wires and the transparent electrode remain unchanged even in circumstances of non-alignment with the conducting wires below, and thus the coupling capacitance may stay constant. In an embodiment where the sub-pixels are rhombus or hexagonal, for example, by adopting the central conducting wire structure of pixels, i.e., by disposing the conducting wires (metal traces) at the centers of the rhombus sub-pixels, the tolerance for a shift level of the conducting wires at the centers of the pixels can be increased through such design implemented by the PA technique.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A liquid crystal display (LCD), at least comprising:
a backlight unit;
a display module, disposed above the backlight unit, having a plurality of pixels each comprising at least three differently-colored sub-pixels, wherein the differently-colored sub-pixels at adjacent columns are in a shifting arrangement; and a barrier, disposed correspondingly to the display module, having a plurality of slanted transparent slits substantially exposing at least parts of regions of the sub-pixels at the same viewing position, and one of the plurality of slanted transparent slits exposing a red sub-pixel, a blue sub-pixel and a green sub-pixel, wherein an extending direction of an array of the red sub-pixel, the blue sub-pixel and the green sub-pixel is substantially the same as an extending direction of the slanted transparent slit, and a width of the slanted transparent slit is substantially equal to or less than a width of one side of the sub-pixels.

2. The LCD according to claim 1, wherein the sub-pixels are rectangular in shape, the differently-colored sub-pixels at adjacent columns are shifted at a long side of the sub-pixels by a fixed length, the fixed length is between ¼ and ¾ of a length of the long side, and the transparent slits expose parts of the regions of the sub-pixels corresponding to the same viewing position.

3. The LCD according to claim 1, wherein the sub-pixels are rhombus in shape, the differently-colored sub-pixels at adjacent columns are arranged along a side of the rhombus sub-pixels, and the transparent slits correspond to a pair of parallel sides of the sub-pixels.

4. The LCD according to claim 1, wherein the sub-pixels are hexagonal in shape, the differently-colored sub-pixels at adjacent columns are arranged along a side of the hexagonal sub-pixels, and the transparent slits expose parts of the regions of the sub-pixels corresponding to the same viewing position.

5. The LCD according to claim 1, formed by a first substrate, a second substrate, and a liquid crystal layer comprising a plurality of liquid crystal molecules and disposed between the first and second substrates; wherein the first and second substrates respectively comprise a first optical alignment layer and a second optical alignment layer.

6. The LCD according to claim 5, wherein same-colored sub-pixels of two adjacent pixels corresponding to the same viewing position form four alignment regions respectively having four different alignment directions to respectively provide four different pre-tilted directions to the liquid crystal molecules corresponding to the four alignment regions.

7. The LCD according to claim 5, wherein each of the sub-pixels comprises a first sub-region and a second sub-region, and the first and second sub-regions respectively have two alignment regions in different alignment directions.

8. The LCD according to claim 7, wherein two of the first sub-regions of same-colored sub-pixels of adjacent pixels corresponding to the same viewing position form four alignment regions in different alignment directions, and two of the second sub-regions form four alignment regions in different alignment directions.

9. The LCD according to claim 7, wherein in same-colored sub-pixels of adjacent pixels corresponding to the same viewing position, the second sub-region of one of the sub-pixels and the first sub-region of one other of the sub-pixels form four alignment regions in different alignment directions.

10. The LCD according to claim 7, wherein the two alignment regions of each first sub-region and each second sub-region are disposed in a top-and-bottom arrangement.

11. The LCD according to claim 7, wherein the two alignment regions of each first sub-region and each second sub-region are disposed in a left-and-right arrangement.

12. An LCD, at least comprising:
a backlight unit;
a display module, disposed above the backlight unit, having a plurality of pixels each comprising at least three differently-colored sub-pixels; and
a barrier, disposed correspondingly to the display module, having a plurality of slanted transparent slits substantially exposing at least parts of regions of the sub-pixels at the same viewing position, and one of the slanted transparent slits exposing a red sub-pixel, a blue sub-pixel and a green sub-pixel, wherein an extending direction of an array of the red sub-pixel, the blue sub-pixel and the green sub-pixel is substantially the same as an extending direction of the slanted transparent slit, and a width of the slanted transparent slit is substantially equal to or less than a width of one side of the sub-pixels;
wherein the sub-pixels are arranged in a closest packing manner, differently-colored sub-pixels at adjacent columns are in a shifting arrangement.

13. The LCD according to claim 12, wherein the sub-pixels are rectangular in shape, the differently-colored sub-pixels at adjacent columns are shifted at a long side of the sub-pixels by a fixed length, and the fixed length is between ¼ and ¾ of a length of the long side.

14. The LCD according to claim 12, wherein the sub-pixels are rhombus in shape, and the differently-colored sub-pixels at adjacent columns are arranged along a side of the rhombus sub-pixels.

15. The LCD according to claim 12, wherein the sub-pixels are hexagonal in shape, and the differently-colored sub-pixels at adjacent columns are arranged along a side of the hexagonal sub-pixels.

16. The LCD according to claim 12, formed by a first substrate, a second substrate, and a liquid crystal layer comprising a plurality of liquid crystal molecules and disposed between the first and second substrates; wherein the first and second substrates respectively comprise a first optical alignment layer and a second optical alignment layer.

17. The LCD according to claim 16, wherein same-colored sub-pixels of two adjacent pixels corresponding to the same viewing position form four alignment regions respectively having four different alignment directions to respectively provide four different pre-tilted directions to the liquid crystal molecules corresponding to the four alignment regions.

18. The LCD according to claim 16, each of the sub-pixels comprises a first sub-region and a second sub-region, and the first and second sub-regions respectively have two alignment regions in different alignment directions.

19. The LCD according to claim 18, wherein two of the first sub-regions of same-colored sub-pixels of adjacent pixels corresponding to the same viewing position form four alignment regions in different alignment directions, and two of the second sub-regions form four alignment regions in different alignment directions.

20. The LCD according to claim 18, wherein in same-colored sub-pixels of adjacent pixels corresponding to the same viewing position, the second sub-region of one of the sub-pixels and the first sub-region of one other of the sub-pixels form four alignment regions in different alignment directions.

* * * * *